Oct. 31, 1944.  R. T. KNAPP  2,361,773

PERIODIC VALVE MECHANISM

Original Filed Jan. 10, 1939

INVENTOR
ROBERT T. KNAPP
BY HARRIS, KIECH, FOSTER & HARRIS

*Clarence F. Kiech*
FOR THE FIRM

ATTORNEYS.

Patented Oct. 31, 1944

2,361,773

UNITED STATES PATENT OFFICE 2,361,773

PERIODIC VALVE MECHANISM

Robert T. Knapp, Los Angeles County, Calif., assignor of one-fourth to Sara E. Riek and one-fourth to Forest O. Riek, both of Los Angeles, Calif.

Original application January 10, 1939, Serial No. 250,143, now Patent No. 2,284,908, dated June 2, 1942. Divided and this application April 3, 1942, Serial No. 437,603

16 Claims. (Cl. 137—145)

This invention relates to a periodic valve mechanism for controlling the flow of fluid.

This application is a division of my application Serial No. 250,143, filed January 10, 1939, for a "Deep well pumping mechanism," which issued as Patent No. 2,284,908, on June 2, 1942.

One object of the invention is to provide a periodic fluid valve actuated by the pressure of the stream of fluid controlled by the valve, having a control mechanism of such a character that the operative cycle of the valve shall have a chronological pattern which is self-determined and unaffected by any external agency or factor other than the effective pressure of the fluid stream upon the valve mechanism.

Another object of the invention is to provide a periodic fluid valve mechanism having a self-determined time cycle in which a valve shall be disposed in one operative position for a period of time which is substantially briefer than that during which it shall be disposed in another operative position.

Considering the periods of time in which the valve is disposed in different operative positions as phases of a complete time cycle of the periodic valve mechanism, it is another object of this invention to provide means for varying the time ratio between the phases of the cycle.

It is still another object of the invention to provide in a periodic valve mechanism means for varying the duration of the complete cycle for any given fluid pressure effective at the valve mechanism.

It is another object of the invention to provide a periodic valve mechanism which for any given effective pressure and any given set of its adjusting devices shall operate with a cycle of constant duration and of constant phase pattern.

It is also an object of this invention to provide in a mechanism of the character described such structural arrangement of parts adapted to accomplish the objects above set forth, that the mechanism will be inexpensive, compact, readily assembled, sturdy, unfailing in operation, and of such a character as to require a minimum of attention, repair, adjustment, and replacement of parts.

Other objects will be apparent from the reading of the following description and drawing.

In the drawing which is for illustrative purposes only:

Figure 1:
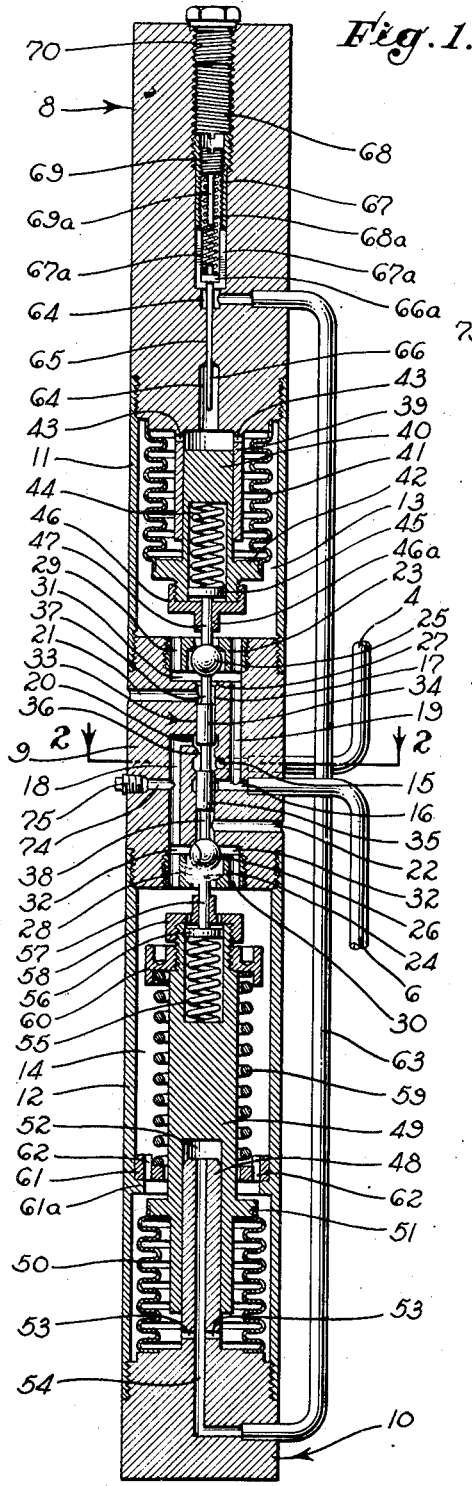
Fig. 1 is a central longitudinal sectional view of a periodic fluid valve mechanism embodying the invention.
Figure 2:
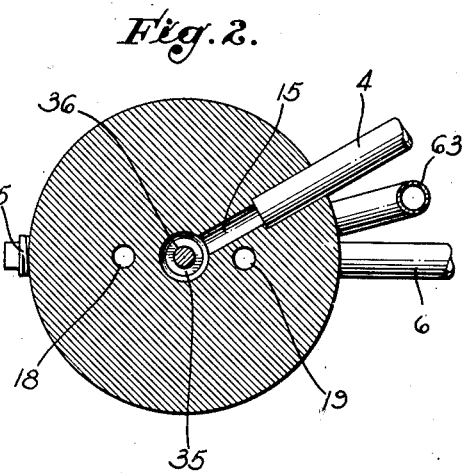
Fig. 2 is a cross sectional view of the mechanism shown in Fig. 1 taken along the line 2—2 thereof.

The housing of the valve mechanism consists of an upper cylindrical block 8, a central cylindrical block 9, a lower cylindrical block 10, an upper section of tubing 11 threaded to and connecting the blocks 8 and 9, and a lower section of tubing 12 threaded to and connecting the blocks 9 and 10. These sections define, between the blocks which they connect, an upper chamber 13 and a lower chamber 14.

A fluid supply conduit 4 adapted to carry fluid under pressure is secured to the central block 9 in communication with a radial port 15, and a receiving conduit 6 for conveying gas from the valve mechanism is secured to the central block in communication with a radial port 16. These ports 15 and 16 communicate at points near the longitudinal center of the block 9 with an axially disposed longitudinal bore 17 which extends from end to end of the central block 9. A port 18 of L-shaped configuration communicates with the axial bore 17 at 20 and leads therefrom to the chamber 14. A passage 19 connects the port 16 with the chamber 13. Two radially disposed exhaust or vent passages 21 and 22 connect the axial bore 17 with the outside of the housing. Two ball cages 23 and 24 are suitably mounted in cylindrical recesses in the upper and lower walls, respectively, of the central block 9 in axial alignment with the bore 17, and house respectively two valve balls 25 and 26 which have coacting relationship with two valve seats 27 and 28 respectively formed at the opposite ends of the bore 17. These valve balls control the passage of gas from the chambers 13 and 14 to the exhaust passages 21 and 22, which, when the corresponding valve ball is in the open position, takes place through a plurality of parallel, longitudinally arranged ports 29 and 30 in the cages 23 and 24 respectively, then through disc-shaped chambers 31 and 32 respectively defined between the cages and the inner walls of the recesses in which the cages are mounted, and thence by the valve seats 27 and 28 to the exhaust passages 21 and 22. The chambers 31 and 32 and ports 29 and 30 also serve to connect the passages 19 and 18 with the chambers 13 and 14 respectively at all times.

A piston slide valve 33 is mounted in the bore 17 and consists of two piston portions 34 and 35 which snugly fit the bore, a central cut-away portion 36, and two reduced end portions or pins 37 and 38 adapted to engage and dislodge from their seats the valve balls 25 and 26. The over-all length of this piston valve is such that when one valve ball is seated, the other is held near the outer portion of its cage. The disposition of the piston portions 34 and 35 and the intermediate cut-away portion 36 is such that when the ball 26 is seated, gas can pass from the port 15 to the passage 18, and when the ball 25 is seated, gas can pass from the port 15 to the port 16.

The upper block 8 has a downwardly extending hollow cylindrical boss 39 in which is slidably mounted a plunger 40. A bellows 41 of fluid-proof material is mounted concentrically about the boss 39, being secured in fluid-tight manner between an annular flange 42 of the plunger 40 and the lower wall of the block 8. Small ports 43 in the base of the boss 39 connect the interior of the boss with the interior of the bellows 41. A coiled compression spring 44 seated in a cylindrical recess in the lower end of the plunger 40 presses downwardly upon a disc 45 which is limited in its downward movement by a recess cap 46. Rigidly secured to the disc 45 is a pin 47 slidably mounted in the cap 46 and which is adapted to engage the ball 25 and impart thereto a movement longitudinally of the valve mechanism.

At the other end of the housing the block 10 is formed with an upwardly extending, axial, cylindrical projection 48 which fits within and has slidable engagement with a cylindrical recess 52 in the lower end of a plunger 49. A bellows 50 similar to the bellows 41 is secured between an annular flange 51 on the plunger 49 and the upper wall of the block 10. Radial ports 53 connect an axial bore 54 in the projection 48 and in the block 10 with the interior of the bellows 50.

A compression spring 55 is mounted in an axially disposed cylindrical recess in the upper end of the plunger 49 and presses upwardly against a disc 56. A pin 57 rigidly secured to this disc slides within a recess cap 58 which limits the upward movement of the disc and pin. The pin is adapted to engage the ball 26 and impart a movement thereto longitudinally of the housing. A coiled compression spring 59, which is seated between a ring 60 threaded on the plunger 49 and a ring 61 slidably fitted within the tubular section 12 and held against movement therein by an inwardly projecting annular flange 61a thereof, acts to urge the plunger upwardly at all times. Ports 62 serve to provide fluid communication between the portions of the chamber 14 above and below the ring 61.

A conduit pipe 63 connects the bore 54 in the lower block with a similar axially disposed bore 64 in the upper block which extends from the upper end of the block 8 to the interior of the boss 39. A slightly tapered constricted section 65 of this bore 64 affords a seat for a needle valve 66. This needle valve is free to reciprocate within the bore section 65. Its reciprocatory movement is limited in one direction by engagement of its head 66a with the lower end of a hollow cylinder 67, the lower portion of which is longitudinally split at 67a, and the upper end of which has threaded engagement with an upper enlarged portion 68 of the bore 64. The cylinder can thus be longitudinally adjusted upon its threads within the bore portion 68. Its movement in the other direction is similarly limited by the lower end of a pin 69a integrally formed with an adjustable stop nut 69 which is threadedly mounted within the cylinder 67. A light coiled spring 68a interposed between the nut 69 and the needle valve head 66a applies a slight downward pressure to the needle valve at all times. A threaded plug 70 closes the upper end of the bore 68, and upon its removal a suitable tool can be inserted within the bore for manipulating the adjusting cylinder 67 and the adjusting nut 69.

The valve mechanism operates in the following manner. The conduit 63, bores 54 and 64, the interior chamber of the boss 39, the recess 52, and the interior of the two bellows are filled with oil of a type suitable for hydraulic work. The spring 59 holds the piston valve 33 in its uppermost position when the valve mechanism is idle, and operation of the valve mechanism begins with the valve in this position. The spring prevents the valve 33 standing in a midway dead center position when there is no fluid pressure in the supply conduit 4. When compressed gas is supplied through the conduit 4, it finds its way through the port 15 and passage 18 to the chamber 14 in which it builds up pneumatic pressure sufficient to urge downwardly the plunger 49 against the spring 59. The bellows 50 is shortened, and the oil within it and within the recess 52 is moved through the bore 54 and the conduit 63 to the bore 64. Here it flows downwardly through the constricted passage 65. The needle 66 is at this juncture at its lowermost position with its head 66a resting upon the lower end of the adjustable cylinder 67, where it is held by the spring 68a. In this position the needle does not quite fill the passage 65, and oil can slowly flow into the interior of the boss 39 and the bellows 41. The plunger 40 moves slowly downward, and after a definite time interval, which, for any given value of the fluid pressure in conduit 4, is obviously determined by the position in which the needle 66 is held by the lower end of the adjustable cylinder 67, the pin 47 contacts the ball 25, which at first resists the pressure exerted upon it by the pin because of upwardly acting gas pressure upon the ball 26. As a result, the spring 44 is compressed. When a tip 46a of the cap 46 comes in contact with the ball 25, the seating of the ball 26 is broken, and then the spring 44, through the pin 47, causes the piston valve 33 to snap to its lower position, in which the ball 25 is seated. This spring 44 and the corresponding spring 55 prevent the valve 33 stopping during its reciprocations at a midway dead center position. Until the piston valve is snapped from its upper to its lower position, the gas in the chamber 13 and in the conduit 6 is free to flow through the ports 29 and passage 19, respectively, to the chamber 31, the bore 17, and the exhaust passage 21, and thence outside the housing.

After the piston valve has been snapped to its lower position, the escape of gas in the chamber 13 is cut off at the valve seat 27. The piston section 34 closes the passage 18, and the section 35 uncovers the port 16, allowing gas to flow from the conduit 4 to the conduit 6 through which it is conducted for any desired functional disposition. The passage 19, which communicates with the port 16, conducts gas to the chamber 13, compressing the bellows 41 and reversing the movement of the oil through the pipe 63. The needle 66 is moved upwardly by hydraulic friction with and the pressure differential of the oil until its head contacts the pin 69a of the adjustable stop nut 69, which obviously permits the oil to flow to the lower end of the housing more rapidly than it flowed to the upper end of the housing. When the oil flows back to the lower end of the valve mechanism and to the interior of the bellows 50, the plunger 49 is raised, eventually snapping the piston valve 33 to its upper position, whereupon the cycle is repeated.

There is thus provided a time cycle of which the phase, during which the receiving conduit is supplied with fluid under pressure, is of briefer duration than the phase during which the receiving conduit is not so supplied or is being vented. Such a time cycle is adapted for certain uses of the periodic valve mechanism. Other uses may require a time cycle of equal phases or one in which the phases as respects their relative duration, are reversed from the sequence above described. The valve mechanism of this invention may by adjustment or a reversal of connections be caused to provide such other time cycles.

Thus by reversing the connections of the housing to the conduits 4 and 6, the phase pattern can be reversed as to relative length of the phases. Movement of the cylinder 67 will change to any desired value the duration of the time cycle as a whole. Turning the stop nut 69 will change the time ratio of the two phases of the cycle. Turning the stop nut to its lowermost position will establish this ratio at unity to equalize the duration of the two phases.

It will be observed that the spring 59, while its primary function is to prevent the piston valve 35 stopping on dead center, also tends to assist the hydraulic fluid entering the recess 52 and bellows 50 in moving the plunger 49 upwardly, thereby shortening the corresponding phase of the cycle of operation of the valve mechanism. Consequently, for certain uses of the valve mechanism requiring cycle phases of equal length it may be necessary to reverse the connections of the conduits 4 and 6 to the housing and compensate for the effect of the spring 59 by spacing the pin 69a a slight distance from the needle valve 66.

It will further be observed that the bellows 41 and 50 increase the volume of oil which must move through the conduit 63 per unit distance of movement of the plungers 40 and 49, serving to increase the duration of the cycle as a whole, steadying its performance, and decreasing the effect on the cycle of changes in the adjusting devices thereby rendering the mechanism capable of closer adjustment.

Figure 3:
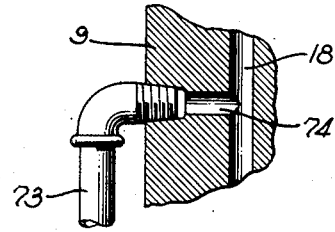
Fig. 3 is a fragmentary central, longitudinal sectional view showing an additional receiving conduit and connection therefor.

For some uses of the valve mechanism, it may be necessary during each cycle to discharge fluid from the supply conduit alternately to two receiving conduits. An additional receiving conduit 73 is shown in Figure 3 connected by a port 74 to the passage 18. When such an additional receiving conduit is not used, the port 74 is closed with a plug 75.

One embodiment of the invention has been shown in the drawing and described herein. The invention is not limited to this or any other specific embodiment but has the scope of the following claims.

I claim as my invention:

1. A periodic valve mechanism, comprising: a reciprocating piston valve; two plungers at opposite ends of said valve adapted to move it in opposite directions; two fluid chambers for applying fluid pressure to move said plungers respectively in a direction toward said valve to engage and move said valve; two fluid chambers for moving said plungers respectively in a direction away from said valve to disengage them from said valve; a closed circuit connection between the two of said fluid chambers for moving said plungers toward said valve; adjustable throttling means in said closed circuit connection; a source of fluid under pressure; means controlled by said piston valve for alternately connecting said source to the fluid chambers for moving said plungers away from said valve; exhaust ports and valves for said last mentioned chambers also controlled by said piston valve; a receiving conduit; and means controlled by said piston valve for connecting and disconnecting said source of fluid under pressure with said receiving conduit.

2. In a fluid valve mechanism, the combination of: a supply conduit adapted to carry fluid under pressure; a receiving conduit having a connection with said supply conduit; a two position valve in said connection adapted in a first position to close said connection and in a second position to open said connection; a first fluid operated means for moving said valve from first to second position; a second fluid operated means for moving said valve from second to first position, each of said means being movable from a retracted to a valve-engaging position and vice versa; a closed fluid-filled circuit connecting said first and second fluid operated means whereby a retractive movement of either one of said means causes an operative movement of the other of said means; a first conduit means connecting said supply conduit to apply fluid pressure to retractively move said first fluid operated means only when said valve is in open position; and a second conduit means connecting said supply conduit to apply fluid pressure to retractively move said second fluid operated means only when said valve is in closed position.

3. The combination defined in claim 2 and in addition thereto a throttling means in said closed fluid circuit.

4. The combination defined in claim 2 and in addition thereto a throttling means in said closed fluid circuit, said throttling means having a greater throttling effect when the fluid is flowing in one direction in said closed circuit than when the fluid is flowing in the other direction therein.

5. The combination defined in claim 2 in which the fluid in said closed circuit is a liquid, and in addition thereto a needle valve in said closed circuit; and means for adjusting said needle valve to vary the throttling effect thereof.

6. The combination defined in claim 2 in which the fluid in said closed circuit is a liquid, and in addition thereto a needle valve in said closed circuit, said needle valve being movable by fluid flow between a stop limiting the forward movement of said needle and a stop limiting the retractive movement thereof.

7. The combination defined in claim 2 in which the fluid in said closed circuit is a liquid, and in addition thereto a needle valve in said circuit, said needle valve being movable by fluid flow between a stop limiting forward movement of said needle and a stop limiting retractive movement thereof, each of said stops being adjustable to vary the corresponding limit of movement of said needle.

8. The combination defined in claim 2 in which the fluid in said closed circuit is a liquid, and in addition thereto: a needle valve in said closed circuit, said needle valve being movable by fluid flow between a stop limiting the forward movement of said needle and a stop limiting the retractive movement thereof; and resiliently acting means effective to hold said needle in its forward position only when fluid is flowing toward the point of said needle.

9. The combination defined in claim 2 in which the fluid in said closed circuit is a liquid and each of said fluid operated means comprises an assembly of a hydraulic cylinder member and a piston member, said assembly being hydraulically connected to said closed circuit and one of said members being movable to engage and change the position of said valve.

10. The combination defined in claim 2 in which the fluid in said closed circuit is a liquid and each of said fluid operated means comprises an assembly of a hydraulic cylinder member and a piston, said assembly being hydraulically connected to said closed circuit and one of said members being movable to engage and change the position of said valve, and in addition thereto: a flexible walled volumetrically variable chamber for each of said fluid operated means and arranged to be expanded and contracted by relative movement of said members in correspondence with increase and decrease respectively in the volume of the working chamber between said cylinder member and piston member, each of said chambers communicating with said closed circuit.

11. The combination defined in claim 2 and in addition thereto: a resiliently acting means for holding one of said fluid operated means in operative position to hold said valve in one of its two positions only when there is no fluid pressure in said conduit.

12. The combination defined in claim 2 and in addition thereto: a resiliently acting means for holding said second fluid operated means in operative position to hold said valve in its closed position only when there is no fluid pressure in said conduit.

13. The combination defined in claim 2 in which the fluid in said closed circuit is a liquid and each of said fluid operated means comprises an assembly of a hydraulic cylinder member and a piston member, said assembly being hydraulically connected to said closed circuit, one of said members being movable to engage and change the position of said valve, and in addition thereto: fluid passages connected to said conduit when said valve is in closed position to apply fluid under pressure to hold said valve in closed position; means operable by said valve when moved from closed position for disconnecting said passages and venting said fluid under pressure; fluid passages connecting said conduit when said valve is in open position to apply fluid under pressure to hold said valve in open position; means operable by said valve when moved from open position for disconnecting said last-mentioned passages and venting said fluid under pressure; a resiliently projectable plunger on the operative end of each of said movable members adapted upon an outward movement of said member to engage said valve with sufficient force to move said valve only when said valve is not held in position by said fluid pressure; and means on each of said movable members positioned to non-resiliently engage said valve subsequently to the moment of engagement of said valve by said plunger and to positively move said valve from position.

14. In a fluid valve mechanism, the combination of: a supply conduit adapted to carry fluid under pressure; a receiving conduit; a first housing having walls defining an elongated bore disposed longitudinally of said housing and having a first ball valve seat at a first end of said housing and a second ball valve seat at the other and second end of said housing, said walls further defining two ports connecting said bore with said conduits respectively, and said walls further defining a first passage connecting said bore with the first end of said housing and a second passage connecting said bore with the second end of said housing and a third passage and a fourth passage connected to vent said bore; a first valve ball and ball cage therefor and a second valve ball and ball cage therefor, each ball and cage being mounted in operative relationship with the correspondingly identified one of said valve bore seats; a piston valve in said bore slightly longer than said bore and adapted to project at one end a relatively short distance from one end of said bore and to be at its other end in transverse registry with the other end of said bore; other housing members forming at the ends of said first housing member a first and a second fluid chamber respectively in communication with said bore; hydraulic cylinder and piston means mounted in each of said chambers coaxially with said bore for engaging and moving a corresponding one of said balls toward its seat; conduit means connecting said cylinders to form a closed circuit whereby contraction of one cylinder chamber effects enlargement of the other cylinder chamber; a resiliently projectable plunger on the ball-engaging ends of the movable element of each of said cylinder and piston means adapted upon an operative movement of said movable element to contact the corresponding ball in advance of said ball-engaging end and move said ball against the adjacent end of said piston valve, said piston, valve, bore, ports, and passages being formed, when said second ball is seated and said first ball is held unseated by the adjacent end of the piston valve, to establish fluid connections between said supply conduit and second chamber through said bore and said second passage, to establish fluid connections between said first chamber and said third passage through said first valve seat and the adjacent end portion of said bore, and when said first ball is seated and said second ball is held unseated by the adjacent end of the piston valve to establish fluid connections between said supply conduit and said discharge conduit through said bore, to establish fluid connections between said supply conduit and said first chamber through said bore and first passage, and to establish fluid connections between said second chamber and said fourth passage through said second valve seat and the adjacent end portion of said bore, each resiliently projected plunger having sufficient resiliently applied force to move said piston valve only when said valve is not held in position by fluid pressure originating in said supply conduit and communicated to and applied to the ball seated at the other end of said valve.

15. The combination defined in claim 14 and in addition thereto a second receiving conduit; a port connecting said second receiving conduit with said bore arranged to connect said second receiving conduit with said supply pipe when said second ball is seated and said first ball is held unseated by the adjacent end of the piston valve.

16. The combination defined in claim 1 and in addition thereto means controlled by said piston valve for venting said receiving conduit only when said receiving conduit is disconnected from said source of fluid under pressure by the operation of said piston valve.

ROBERT T. KNAPP.